United States Patent [19]

Mannava et al.

[11] Patent Number: 5,569,018
[45] Date of Patent: Oct. 29, 1996

[54] TECHNIQUE TO PREVENT OR DIVERT CRACKS

[75] Inventors: Seetharamaiah Mannava, Cincinnati; William D. Cowie, Xenia, both of Ohio

[73] Assignee: General Electric Company, Cincinnati, Ohio

[21] Appl. No.: 399,319

[22] Filed: Mar. 6, 1995

[51] Int. Cl.⁶ .................................................. F04D 29/44
[52] U.S. Cl. ..................... 415/200; 148/525; 219/121.65
[58] Field of Search ...................... 415/200; 219/121.65, 219/121.66; 148/525, 565

[56] References Cited

U.S. PATENT DOCUMENTS

| | | |
|---|---|---|
| 3,566,662 | 3/1971 | Champoux . |
| 3,689,176 | 9/1972 | Howell et al. . |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,397,608 | 8/1983 | Husain et al. ........................ 415/200 |
| 4,401,477 | 8/1983 | Clauer et al. . |
| 4,426,867 | 1/1984 | Neal et al. .................................. 72/53 |
| 4,475,864 | 10/1984 | Patacca et al. ......................... 415/200 |
| 4,557,033 | 12/1985 | Champoux . |
| 4,934,170 | 6/1990 | Easterbrook et al. . |
| 4,937,421 | 6/1990 | Ortiz, Jr. et al. . |
| 5,127,019 | 6/1992 | Epstein et al. . |
| 5,131,957 | 7/1992 | Epstein et al. . |
| 5,226,785 | 6/1993 | Narayana et al. . |
| 5,306,360 | 4/1994 | Bharti et al. . |
| 5,307,622 | 5/1994 | Ciokajlo et al. . |
| 5,308,226 | 5/1994 | Venkatasubbu et al. . |

OTHER PUBLICATIONS

Laser Shock Processing Increases the Fatique Life of Metal Parts. Sep. 1991.
"Jet Engines And Propulsion Systems For Engineers", Edited by Thaddeus W. Fowler, Ed.D. for Human Resource Development, G.E. Aircraft Engines, 1989.
American Machinist, "Laser Shocking Extends Fatigue Life", by John A. Vaccari, pp. 62–64, Jul. 1992, A Penton Publication.

*Primary Examiner*—John T. Kwon
*Attorney, Agent, or Firm*—Andrew C. Hess; Nathan D. Herkamp

[57] ABSTRACT

Gas turbine engine static component with a metallic panel section, either linear or curved, that is susceptible to cracks initiated by features on the component has an elongated laser shock peened region having deep compressive residual stresses imparted by laser shock peening (LSP) disposed between the feature and a portion of the panel section, which is to be protected from failure, such that the laser shock peened region diverts cracks that propagate from the feature away from the portion of the panel section. The laser shock peened region preferably extends through the component and is may be formed by simultaneously laser shock peening first and second laser shock peened surface areas to form the laser shock peened region.

12 Claims, 3 Drawing Sheets

TECHNIQUE TO PREVENT OR DIVERT CRACKS

RELATED PATENT APPLICATIONS

The present Application deals with related subject matter in co-pending U.S. patent application Ser. Nos. 08/319,346, entitled "LASER SHOCK PEENED ROTOR COMPONENTS FOR TURBOMACHINERY"; 08/375,133 entitled "LASER SHOCK PEENED GAS TURBINE ENGINE FAN BLADE EDGES"; 08/399,325, entitled "LASER SHOCK PEENED GAS TURBINE ENGINE BLADE TIP"; 08/399,285, entitled "LASER SHOCK PEENED GAS TURBINE ENGINE COMPRESSOR AIRFOIL EDGES"; and 08/399,287, entitled "DISTORTION CONTROL OF LASER SHOCK PEENED BLADE EDGES".

BACKGROUND OF THE INVENTION

1. Field of the Invention

This invention relates to gas turbine engine cracks and, more particularly, to techniques to divert cracks from sensitive areas and also so that the cracks propagate in a more benign mode than would otherwise occur.

2. Description of Related Art

Gas turbine engine stationary structures and components as contrasted to gas turbine engines rotors are subject to cracking due to thermal, pressure and vibratory or flight loads which subject the components to fatigue failure and reduced life. Stationary turbine vane airfoils, typically made from Titanium materials, are subject to stress due to various excitations of the airfoil in bending and torsional flexure modes. Airfoil failure can result from these responses of the airfoil to combinations of chordwise and spanwise bending modes resulting from gaseous flow impingement, rotor blades passing by stator vanes and flutter. These excitation responses are characterized by nodal patterns on the airfoil resulting in panel sections of the airfoil, or other stationary plate type components, vibrating at resonant frequencies. Cracks form and propagate along nodal lines of the nodal patterns. Nodal lines are linear or curvilinear lines about which portions of the vane airfoil or plate bend and are therefore subject to maximum stress levels. Different nodal lines, modes, and modes of failure are characterized by their order of resonance, i.e. 1st, 2nd, 3rd, etc..

Different modes of failure also can cause different degrees of damage some less severe or more benign than others. For example, a variable angle vane has a trunioned vane and a crack which progresses from a crack initiation point due to an 8th order failure mode sometimes shifts (depending on vane thickness variations) to a 9th order failure mode. The 8th order failure mode results in the release of a lower corner of the vane airfoil causing minor damage to downstream compressor blades and engine components and experience shows that the engine continues to run. The 9th order failure mode results in release of a lower trunnion portion which is significantly larger than the portion released by an 8th order failure mode and has been found to result in considerably more downstream damage and may even result in an engine failure or shutdown. Therefore, it is also highly desirable to design and construct gas turbine engine static components which are susceptible to more than one resonant mode of failure such that should a failure occur it is the one which causes less damage or is more benign than the other. The present invention is directed towards this end and provides a gas turbine engine static component and in particular a trunioned variable stator vane airfoil with at least one region of deep compressive residual stresses imparted by laser shock peening disposed in an area between two nodal lines of two respective resonance failure modes.

Another area of concern as regards to the present invention is cracks that originate at features of casings and then propagate into sensitive or area that are more vulnerable to fatigue induced failure. Combustor cases have annular shells or panels that axially extend between integrally formed annular flanges which are bolted to adjacent flanges of adjacent casings. Certain compressor casings such as those found on a General Electric T39 have horizontally split cases with horizontal axially extending flanges which terminate at annular flanges which are bolted to the annular flanges of the adjacent combustor casing. The points at which the horizontal axially extending flanges terminate at annular flanges is a feature which causes high localized stress in the annular flange of the combustor casing which can cause a crack to initiate in the flange and propagate to the point of fatigue failure in the shell of the combustor casing. The shells are relatively thin as compared to the flanges and are subject to fatigue failure because of thermal and pressure loading. A fuel nozzle boss on the combustor casing shell is another feature that is capable of initiating a crack that can propagate into areas of the shell that are more susceptible to fatigue failure, such as the hotter running areas that are axially downstream of the fuel nozzles. Therefore, it is highly desirable to design and construct gas turbine engine static components such as combustor casing which are susceptible to such cracks with means to divert cracks that divert the cracks which are initiated from certain features attached to the shell and prevent them from propagating into areas of the shell that are more susceptible to fatigue failure. The present invention is directed towards this end and provides a gas turbine engine static combustor shell with at least one region of deep compressive residual stresses imparted by laser shock peening disposed in an area between such crack initiating features and the shell of the component casing.

The region of deep compressive residual stresses imparted by laser shock peening of the present invention is not to be confused with a surface layer zone of a workpiece that contains locally bounded compressive residual stresses that are induced by a hardening operation using a laser beam to locally heat and, thereby, harden the workpiece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening as understood in the art and as used herein means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". However, the prior art does not disclose fan blade leading edges of the type claimed by the present patent nor the methods of how to produce them. It is to this end that the present invention is directed.

SUMMARY OF THE INVENTION

The present invention provides a gas turbine engine static component having a metallic panel section, either linear or curved, that is susceptible to cracks that are initiated by features on the component with an elongated laser shock peened region having deep compressive residual stresses imparted by laser shock peening (LSP) disposed between the feature and a portion of the panel section such that the laser shock peened region diverts cracks that propagate from the feature away from the portion of the panel section. The laser shock peened region preferably extends through the component and is may be formed by simultaneously laser shock peening first and second laser shock peened surface areas to form the laser shock peened region.

The static component in one embodiment of the present invention is a gas turbine engine casing and the panel section is an annular shell extending axially between two annular end flanges. In one more particular embodiment, the elongated laser shock peened area is annular and disposed through at least one of the flanges between an annularly extending generally evenly distributed plurality of bolt holes around the flange and the shell. The invention may be used on a gas turbine engine combustor casing for attachment to an adjacent horizontally split compressor casing having a horizontal flange which terminates at a position corresponding to a number of the bolt holes on the annular flange, and the elongated laser shock peened region is disposed in an arc on the annular flange between the number of the plurality of bolts and the shell. Another more particular embodiment of the invention is a combustor casing having generally annularly disposed bosses welded onto the shell between the annular flanges and the elongated laser shock peened region is an annular region in the shell located between the bosses and the aft annular flange.

Another embodiment of the present invention provides a gas turbine engine static component having a metallic panel section with at least two predetermined nodal lines and which is subject to at least two resonant failure modes that can cause two different resonance induced crack lines respectively associated with the two modes of resonance and predetermined nodal lines. A generally elongated laser shock peened surface area is disposed across only one of the nodal lines on the panel section and a region having deep compressive residual stresses imparted by laser shock peening (LSP) extends into the section from the laser shock peened surface area. In one exemplary embodiment of the present invention, the modes of resonance are successive resonance modes.

In one more particular exemplary embodiment of the present invention, the static component is a variable angle vane and the panel section is an airfoil attached to the vane. A yet more particular embodiment provides the vane with an integrally formed trunnion (there are typically two such trunnions an upper and a lower) such that the first nodal line does not intersect the trunnion and the second nodal line does intersect the trunnion. The modes of resonance may be successive resonance modes which in one particular embodiment are eighth and ninth order resonance modes and the ninth order resonance mode has a respective ninth order nodal lines which crosses over the axis of the trunnion.

ADVANTAGES

Among the advantages provided by the present invention is the ability to safely build and operate gas turbine engine static components designed to operate longer in high stress and vibratory stress fields without undergoing fatigue failure. Another advantage of the present invention is that it provides gas turbine engine static components that can force a fatigue failure to occur in a more benign with less severe direct and collateral damage than would otherwise occur. The present invention also offers the advantage of building such static components with longer commercially acceptable life spans without increasing thicknesses or weight of the static components. The present invention makes it possible to safely extend the time between overhaul and replacement of such static components. The present invention can be advantageously used to ensure safer and more reliable operation of gas turbine engines between inspections where related fatigue induced cracks are not discovered or are not discoverable.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
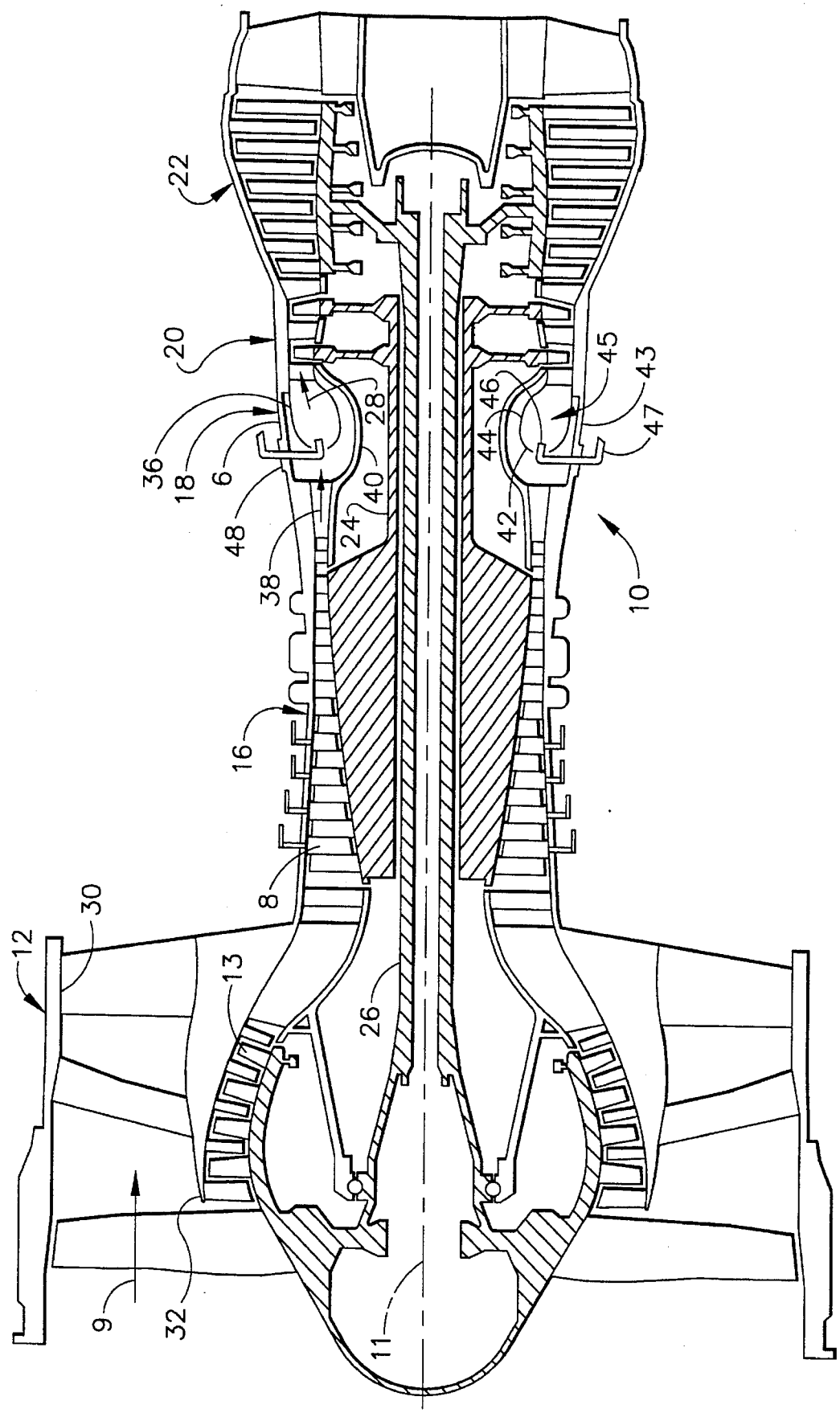
FIG. 1 is a cross-sectional illustrative view of an exemplary aircraft gas turbine engine in accordance with the present invention.

Illustrated in FIG. 1 is a schematic representation of an exemplary aircraft gas turbine engine 10 including a combustor casing 6 and a variable compressor vane 8 in accordance with two exemplary embodiments of the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12.

A large portion of fan air 9 passing through the fan section 12 and is bypassed around a booster fan 13 and the high pressure compressor 16 and the hot section through a bypass duct 30 having an entrance or splitter 32 between the fan section 12 and the booster fan 13 which leads to the high pressure compressor 16. The variable compressor vanes 8 are commonly used in high pressure compressors 16 such as can be found in aircraft gas turbine engines such as the General Electric TF-39 and CF-6 engines.

Fuel is burned in the combustion section 18 producing a very hot gas flow 28 which is directed through the high pressure and low pressure turbines 20 and 22 respectively to power the engine 10. A combustor 36 is positioned in compressor discharge flow 38 between the outer combustor casing 6 and an inner combustor casing 40. The combustor 36 is illustrated as having an annular combustor dome 42 with aftwardly extending outer and inner annular combustor liners 43 and 44 respectively. The outer and inner annular combustor liners 43 and 44 respectively are radially spaced from each other to define a portion of annular combustion flow path or combustion zone 45 therebetween, within which a mixture of fuel and air from a plurality of fuel nozzles 46 is discharged for ignition and combustion. Fuel is introduced to the fuel nozzles 46 by fuel tubes 47 which pass though bosses 48 in the outer combustor casing 6.

Figure 2:
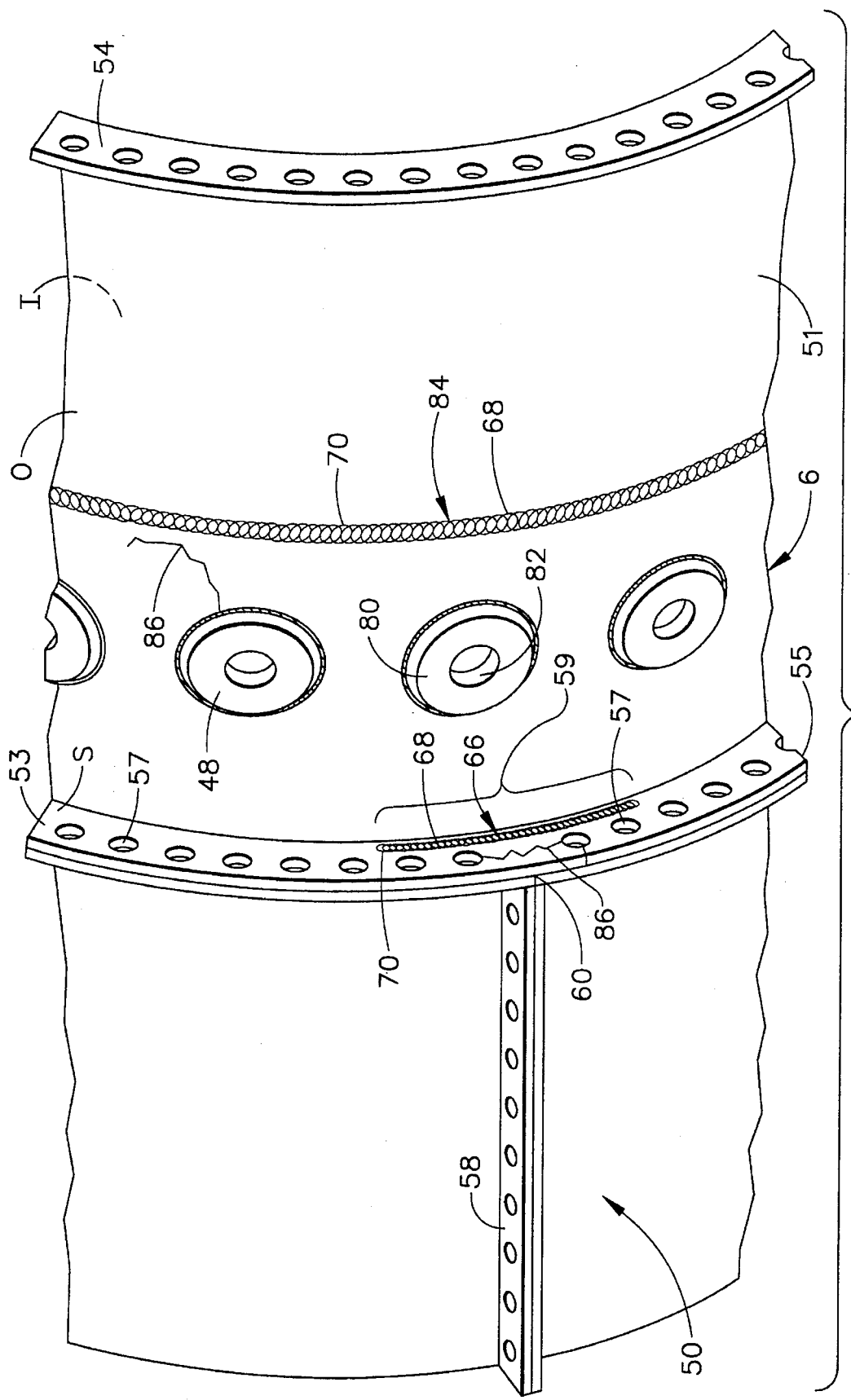
FIG. 2 is a perspective illustrative view of a portion of engine casing of the aircraft gas turbine engine illustrated in FIG. 1.
Figure 2A:
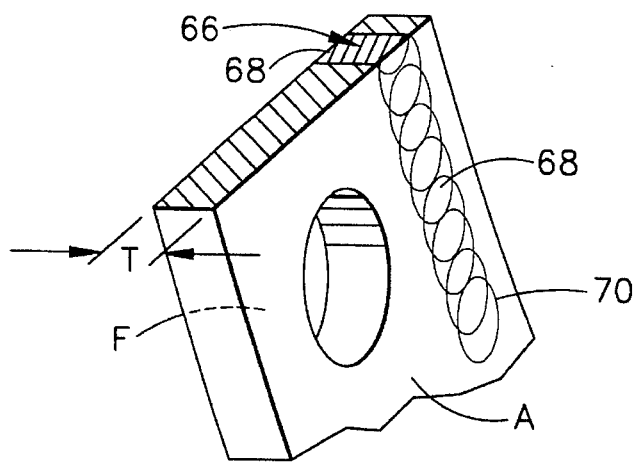
FIG. 2A is an enlarged perspective illustrative view of a portion of a flange of the casing of the aircraft gas turbine engine illustrated in FIG. 2.

Illustrated in FIGS. 2 and 2A is the annular combustor casing 6 attached to an adjacent horizontally split compressor casing 50. The combustor casing 6 is static component having a curved panel section in the form of an annular pressure shell 51 extending axially between forward and aft annular end flanges 53 and 54 respectively. The forward and aft annular end flanges 53 and 54 each has a ring 55 of bolt holes 57 disposed therethrough for attachment to adjacent casings and their flanges such as the horizontally split compressor casing 50. The horizontally split compressor casing 50 includes horizontal flanges 58 which terminate at a position 60 corresponding to a number or group 59 of bolt holes 57 of the ring 55 on the forward end flange 53. This feature of the combustor casing 6 is capable of initiating cracks 60 that propagate from the feature, as represented by the group 59 of the bolt holes, to the shell 51 which could lead to a reduction in the structural integrity and eventually to a highly undesirable failure of the shell.

Therefore, in order to prevent such an occurrence, the present invention provides an arc shaped elongated laser shock peened region 66 having deep compressive residual stresses imparted by laser shock peening on the forward flange 53 between the group 59 of the bolt holes and the shell 51. The elongated laser shock peened region 66 extends into the forward flange 53 from an elongated laser shock peened surface area 68 indicated by the line of circles 70 along the laser shock peened surface area. The line of circles 70 generally indicate the spots where the laser beam hits and forms the laser shock peened surface area 68. The laser shock peened region 66, preferably, should extend though the entire thickness of the forward flange 53 from an aft facing side A through to a forward facing side F of the forward flange. Preferably, both sides of the forward flange 53 are simultaneously laser shock peened forming laser shock peened surface area 68 on both the aft and forward facing sides A and F and the laser shock peened region 66 between them.

Illustrated in FIG. 2 is another embodiment of the present invention for which the crack initiating features are fuel line welded on the bosses 48 circumferentially disposed around and having fuel line apertures 82 extending through the shell 51 of the combustor casing 6. The welded on bosses are capable of initiating cracks 86 that propagate from the welded on bosses 48 axially aftward to coalesce further on aft on the shell 51 which could lead to a reduction in the structural integrity and eventually to a highly undesirable failure of the shell. An annular laser shock peened region 84, having deep compressive residual stresses imparted by laser shock peening, extends entirely around the shell 51 as indicated by the line of circles 70 along the laser shock peened annular surface area 68. The annular laser shock peened region 84 preferably should extend though the entire thickness of the shell 51. The line of circles 70 generally indicate the spots where the laser beam hits and forms the laser shock peened surface area 68. Preferably, both sides of the shell 51 are simultaneously laser shock peened forming laser shock peened surface areas 68 on both an inside I and an outside 0 of the shell 51 and the annular laser shock peened region 84 between them.

Figure 3:
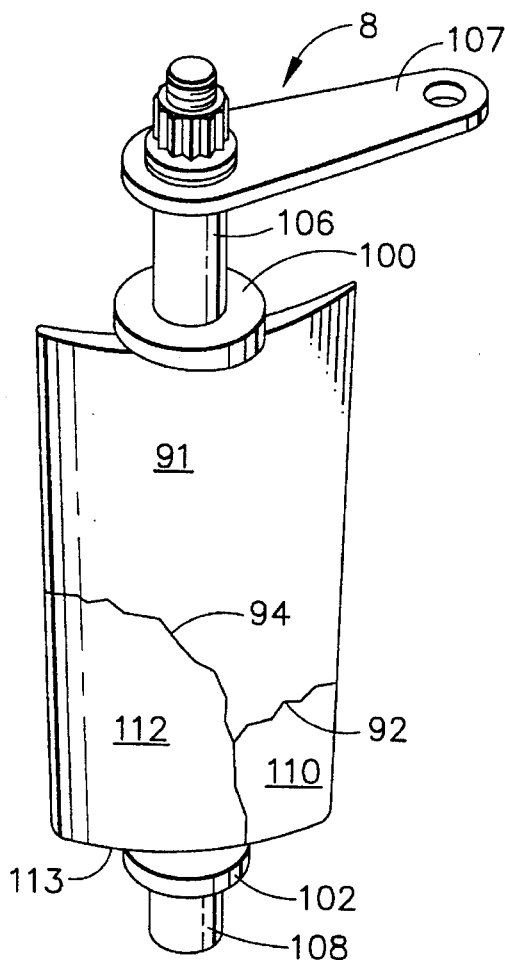
FIG. 3 is a perspective illustrative view of a prior art variable vane of that might be used an aircraft gas turbine engine similar to the one illustrated in FIG. 1.
Figure 4:
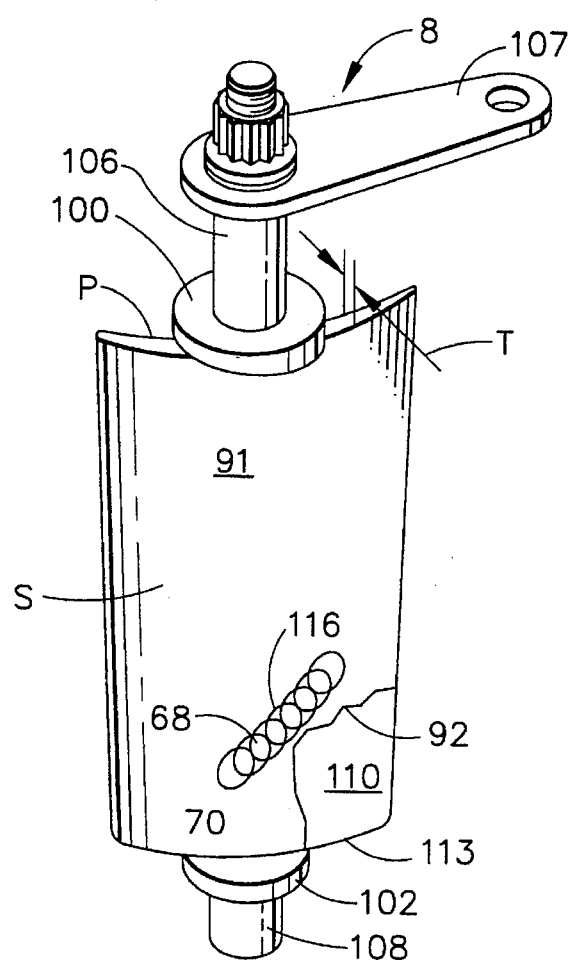
FIG. 4 is a perspective illustrative view of a variable vane in accordance with the present invention as illustrated in the aircraft gas turbine engine of FIG. 1.

Illustrated in FIGS. 3 and 4 is another embodiment of the present invention for which the static component is the variable compressor vane 8 having a thin solid airfoil 91 as the metallic panel section and the crack initiating features are predetermined first and second nodal lines 92 and 94 respectively which for one exemplary embodiment corresponds to successive eighth and ninth order resonance modes. The airfoil 91 has integrally formed upper and lower trunnions 100 and 102 respectively that include upper and lower spindles 106 and 108 respectively and is subject to at least two resonant failure modes along the predetermined adjacent first and second nodal lines 92 and 94. The upper spindle 106 is attached to a lever arm 107 that is used to actuate the airfoil 91 in order to vary its angle. The eighth and ninth order resonance modes can cause two different resonance induced crack lines respectively associated with the two modes of resonance and which generally follow the eighth and ninth nodal lines as illustrated by the first and second nodal lines 92 and 94 respectively. This can result in a failure and release of first and second pieces 110 and 112 of the airfoil 91 which are generally delineated by the first and second nodal lines 92 and 94 respectively. A crack may be initiated and started along the first nodal line 92 where it intersects a free edge 113 of the airfoil 91 but then later on it may precede along the second nodal line 94 resulting in the release of a larger second piece 112 of the airfoil 91 that includes the lower trunnion 102.

Referring now, more specifically, to FIG. 4, in order to prevent the larger first piece 110 from breaking off a generally elongated laser shock peened region 116, having deep compressive residual stresses imparted by laser shock peening (LSP), is disposed across only the second nodal line 94 corresponding to the ninth order resonance modes. Preferably, the airfoil 91 can be laser shock peened on a pressure side P and suction side S of the airfoil 91 forming two elongated laser shock peened surface areas 68, one on each of the sides, thereby, forming the laser shock peened region 116 such that it extends through the entire thickness T of the airfoil 91 along its entire length indicated by the line of circles 70 which represent the laser spots.

The laser beam shock induced deep compressive residual stresses in the laser shock peened regions are generally about 50–150 KPSI (Kilo Pounds per Square Inch) extending from the laser shocked peened surface areas to a depth of about 20–50 mils into the laser shock induced compressive residually pre-stressed regions. The laser beam shock induced deep compressive residual stresses are produced by repetitively firing a high energy laser beam that is focused on the laser shock peened surface area, or just a bit above or below the surface area, which is covered with paint to create peak power densities having an order of magnitude of a gigawatt/cm$^2$. The laser beam is fired through a curtain of flowing water that is flowed over the painted laser shock peened surface area and the paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water. This and other methods for laser shock peening are disclosed in greater detail in U.S. patent Ser. No. 08/319,346, entitled "LASER SHOCK PEENED ROTOR COMPONENTS FOR TURBOMACHINERY", and in U.S. patent Ser. No. 08/363,362, entitled "ON THE FLY LASER SHOCK PEENING" which are both incorporated herein by reference.

While the preferred embodiment of the present invention has been described fully in order to explain its principles, it is understood that various modifications or alterations may be made to the preferred embodiment without departing from the scope of the invention as set forth in the appended claims.

We claim:

1. A gas turbine engine static component comprising:

a metallic panel section adjacent a crack initiating feature of the component, a generally elongated laser shock peened region having deep compressive residual stresses imparted by laser shock peening (LSP) disposed between said feature and a portion of said panel section, said laser shock peened region is positioned such that said laser shock peened region diverts cracks that propagate from said feature away from said portion of said panel section, and said laser shock peened region extending into the component from a corresponding elongated laser shock peened surface area.

2. A static component as claimed in claim 1 further comprising oppositely facing first and second sides of said component and said laser shock peened region extends from said first side to said second side.

3. A static component as claimed in claim 2 further comprising oppositely facing first and second laser shock peened surface areas on said first and second sides respectively and said laser shock peened region extends from said first laser shock peened surface area to said second laser shock peened surface area.

4. A static component as claimed in claim 3 wherein said first and second laser shock peened surface areas were formed by being simultaneously laser shock peened.

5. A static component as claimed in claim 2 wherein said static component is a gas turbine engine casing and said panel section is an annular shell, said annular shell is disposed between two annular end flanges, said elongated laser shock peened area is annular and disposed through at least one of said flanges between an annularly extending plurality of bolt holes and said shell.

6. A static component as claimed in claim 5 wherein said gas turbine engine casing is a combustor casing for attachment to an adjacent horizontally split compressor casing having a horizontal flange, said horizontal flange terminating at a position corresponding to a number of said plurality of bolt holes on said annular flange, and said elongated laser shock peened region is disposed in an arc on said annular flange between said number of said plurality of bolt holes and said shell.

7. A static component as claimed in claim 5 wherein said gas turbine engine casing is a combustor casing having generally annularly disposed bosses welded onto said shell between said annular flanges, and said elongated laser shock peened region is an annular region in said shell located between said bosses and said aft one of said annular flanges.

8. A static component as claimed in claim 1 wherein said static component is a variable angle vane and said panel section is an airfoil attached to said vane, said metallic panel section is subject to first and second resonance induced crack lines respectively associated with first and second modes of resonance and respective predetermined first and second nodal lines, said crack initiating feature is a point of said first nodal line that intersects a free edge of said airfoil, and said elongated laser shock peened surface region is disposed across said second nodal line on said panel section.

9. A static component as claimed in claim 8 wherein said vane includes a trunnion at least partially integrally formed with said panel section such that said first nodal line does not intersect said trunnion and said second nodal line does intersect said trunnion.

10. A static component as claimed in claim 9 wherein said modes of resonance are successive resonance modes.

11. A static component as claimed in claim 10 wherein said trunnion is a lower trunnion.

12. A static component as claimed in claim 11 wherein said modes of resonance are successive resonance modes comprising eighth and ninth order resonance modes and said ninth order resonance mode has a respective ninth order nodal lines which crosses over said axis of said trunnion.

* * * * *